June 14, 1966
A. L. JENNY ETAL
3,256,468
ELECTRODE FOR ELECTRICAL CAPACITORS
AND METHOD OF MAKING THE SAME
Filed April 17, 1962
2 Sheets-Sheet 1
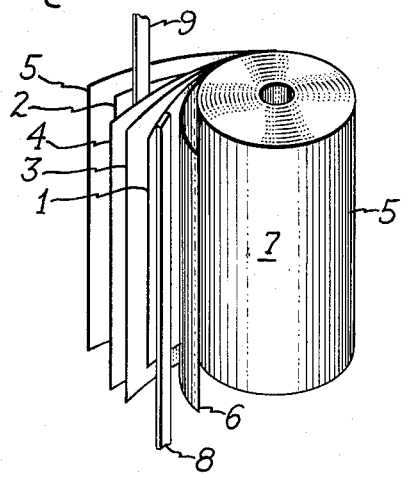
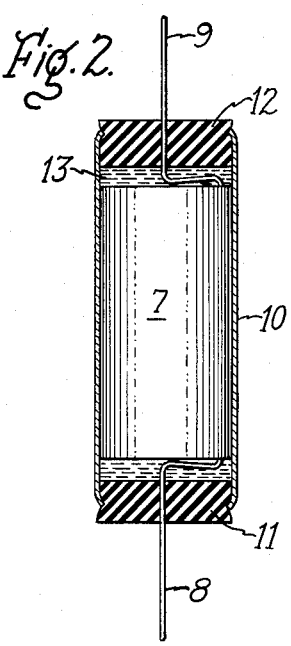
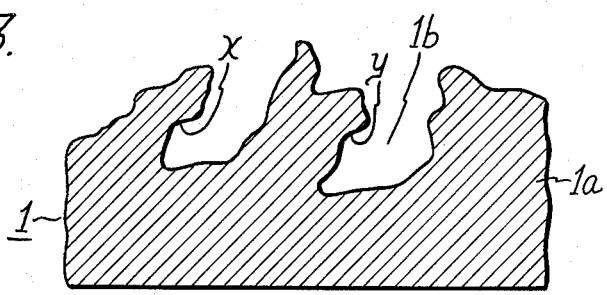
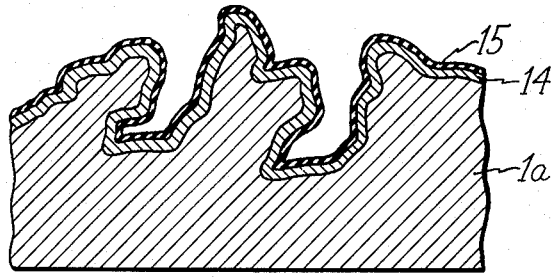
Inventors,
Alfred L. Jenny,
Levin W. Foster,
by Sidney Greenberg
Their Attorney.

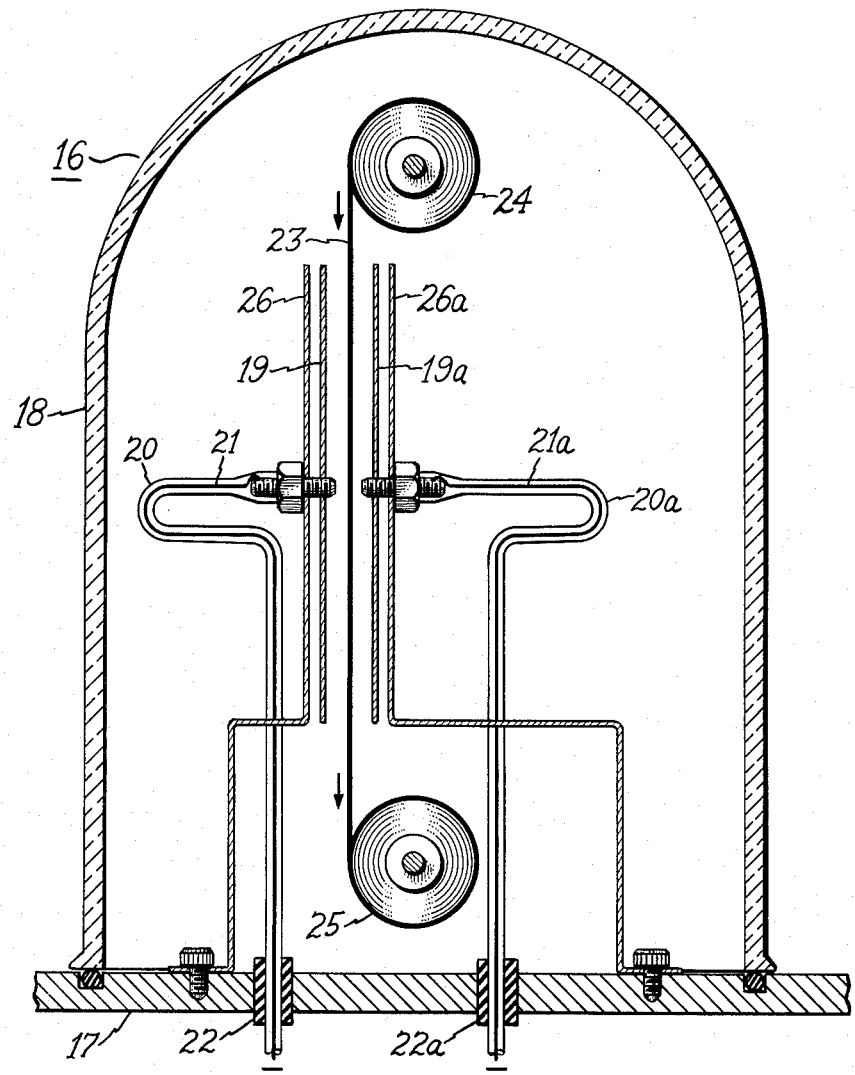

United States Patent Office 3,256,468
Patented June 14, 1966

3,256,468
ELECTRODE FOR ELECTRICAL CAPACITORS AND METHOD OF MAKING THE SAME
Alfred L. Jenny and Levin W. Foster, Columbia, S.C., assignors to General Electric Company, a corporation of New York
Filed Apr. 17, 1962, Ser. No. 188,106
3 Claims. (Cl. 317—230)

The present invention relates to electrical capacitors, and more particularly to an improved film-forming electrode therefor.

Aluminum is conventionally used as a film-forming electrode material for electrolytic capacitors, and has such advantages as lightness and economy, and it is readily etched to provide substantially increased capacitance per unit area. However, the capacitance properties of film-formed aluminum electrodes are not as favorable as other known film-forming electrode materials. On the other hand, tantalum, a commonly employed capacitor electrode metal, does provide substantially higher unit capacitance than aluminum but has the drawbacks of being rather expensive and considerably heavier than aluminum.

It is an object of the invention to provide an aluminum-base electrode for electrical capacitors having improved electrical properties, and particularly higher capacitance per unit area.

It is another object of the invention to provide a film-forming electrode for electrolytic capacitors which has the properties of being readily etched to increase its effective surface area coupled with a dielectric oxide film characterized by high unit capacitance.

It is a further object of the invention to provide an electrode of the above type comprising an aluminum base coated with tantalum.

It is still another object of the invention to provide a tantalum-coated etched aluminum electrode wherein the electrode is characterized by the superior capacitance and other properties of tantalum without sacrifice of the increased capacitance afforded by the etched aluminum substrate, and to provide a method of making the same.

Other objects and advantages will become apparent from the following description and the appended claims.

With the above objects in view, the present invention relates to an electrode comprising an aluminum base member having an etched surface and a continuous coating of tantalum on the etched aluminum surface, the tantalum coating having a continuous anodic dielectric oxide film formed thereon, the surface contour of the tantalum-coated electrode substantially corresponding to the etched surface of the aluminum base member.

In accordance with the invention, the tantalum coating is applied to the etched aluminum base by sputtering the tantalum metal thereon as hereinafter more fully described.

The invention will be better understood from the following description taken in conjunction with the accompanying drawing, in which:

FIGURE 1 shows an electrolytic capacitor assembly of rolled type in which the invention may be embodied;

FIGURE 2 shows the capacitor assembly of FIGURE 1 arranged in a case;

FIGURE 3 is a magnified detailed view of a capacitor electrode substrate which may be used in practicing the invention;

FIGURE 4 is a view similar to that of FIGURE 3 showing the etched substrate with a film-formed tantalum coating thereon; and FIGURE 5 shows in diagrammatic form an apparatus which may be employed for making the capacitor electrode of the present invention.

Referring now to the drawing, and in particular to FIGURE 1, there is shown a partially unrolled capacitor roll body comprising a pair of electrode foils 1 and 2, at least one of which is composed in accordance with the invention of an etched aluminum substrate having a film of tantalum deposited on the surface thereof, the tantalum film having an anodic dielectric oxide film formed thereon. The tantalum film is deposited on the etched aluminum substrate in the manner hereinafter more fully disclosed and the dielectric oxide film on the tantalum film may be produced by anodizing (film-forming) processes well known in the electrolytic capacitor art. Between foils 1 and 2 are sheets of dielectric spacer material 3, 4, 5, and 6, composed conventionally of cellulosic material, such as kraft paper, or other suitable material of permeable or porous impregnatable nature. Terminals or tap straps 8 and 9 are secured to the respective foils and extend in opposite directions. The electrode foils and dielectric sheets are wound into a compact roll 7 prior to insertion into a casing as shown in FIGURE 2.

FIGURE 2 shows the capacitor roll assembly 7 enclosed in a metal casing 10 with terminals 8 and 9 extending respectively through plugs or discs 11, 12 of insulating material, such as a synthetic resin, providing a fluid-tight seal for the interior of the casing. Electrolyte 13 having any suitable composition of known type fills casing 10 and impregnates the porous spacing material.

While a rolled foil type of electrolytic capacitor is shown, it will be understood that other types of electrodes for electrolytic capacitors employing liquid electrolytes, such as wire, flat plates, or other forms may embody the present invention for obtaining similar benefits.

Moreover, the invention may be embodied in foil type capacitors having a solid electrolyte of $MnO_2$ or the equivalent such as disclosed in co-pending application Serial No. 187,574 filed April 16, 1962 in the name of H. Cohn and assigned to the same assignee as the present invention. In such application, particular advantages are afforded. It is known that aluminum and aluminum oxide are more susceptible than tantalum and tantalum oxide to corrosion and attack by the hot acidic manganous nitrate aqueous solution used in applying the $MnO_2$ layer. The present invention avoids such degradation of the aluminum electrode by covering the aluminum surfaces with a thin continuous film of tantalum.

The nature of the etch on aluminum foil is such that the capacitance per unit area does not decrease so rapidly with increasing forming voltage as does etched tantalum. This property is preserved even after sputtering with tantalum. Thus, at formation voltages of 200 volts D.C. and up, the capacitance per unit area is enhanced over tantalum by the factor of the etch ratios and over aluminum by the factor of the dielectric constants. This invention provides, by this dual advantage, for greater volumetric efficiency in both polar and nonpolar foil type capacitors, and the resulting capacitor structure makes possible substantial economy in weight and critical material for various applications.

FIGURE 3 shows electrode 1 in the condition wherein the aluminum base member 1a, which typically is a sheet of foil 1 to 6 mils or more thick, has been etched to increase its effective surface area prior to the application of the tantalum coating thereon. As is evident, the etching produces deep fissures 1b in the aluminum foil surface which include undercut portions such as represented by surfaces x and y. Etching of the aluminum foil 1a may be accomplished by electrolytic or chemical etching processes well known in the art. For example, a suitable etching procedure comprises anodic treatment of the aluminum foil in about an 8% by weight aqueous solution of sodium chloride.

Such a process may result in increasing the effective surface area of the aluminum foil by as much as 4 to 8 times.

In accordance with the invention and as illustrated in FIG. 4, the aluminum foil 1a etched by the above-described or other suitable method is then subjected to a process in which a film of tantalum 14 is applied on the etched aluminum surface and the tantalum layer anodized to provide a tantalum oxide dielectric film 15 thereon. We have found that an effective means of applying a tantalum coating on the etched aluminum base without sacrificing the capacitance gain afforded by the etched aluminum surface is by sputtering the tantalum on the aluminum member. The capacitance obtained with tantalum-coated aluminum electrodes thus produced was unexpectedly high, since it was anticipated in depositing tantalum on the etched aluminum by the sputtering process that the etched pits in the aluminum surface would be at least partly filled with metallic tantalum, thus losing some of the etch gain.

After the tantalum is sputtered on the etched aluminum base, as hereinafter more fully described, the tantalum-coated aluminum electrode is subjected to a suitable anodizing process to produce thereon the described anodic tantalum oxide dielectric layer, in accordance with known techniques. A suitable anodizing process comprises treatment of the electrode in a solution of ammonium borate or boric acid in ethylene glycol containing up to 10% water, the resistivity and concentrations being modified in accordance with the terminal voltage desired in order to avoid scintillation.

The deposition of metals by the process of sputtering is well known in general. Sputtering occurs when an electrical discharge passes between electrodes under reduced gas pressure. Under these conditions, the cathode slowly disintegrates under the bombardment of ionized gas molecules. Metallic material leaves the cathode surface in atomic form or in chemical combination with the residual gas molecules. Part of the cloud of atoms thus formed condenses on surfaces nearby, while the remainder returns to the cathode and undergoes further bombardment.

FIGURE 5 shows an apparatus suitable for use in sputtering a coating of tantalum on an etched aluminum member in accordance with the invention. As shown, the apparatus comprises an evacuated vessel 16 (vacuum port not shown) comprising a base plate 17 and transparent housing 18 resting thereon and containing a gas under reduced pressure. Within the vessel are cathode sheets 19, 19a of tantalum held in spaced relation by glass conduit members 20, 20a through which pass cathode leads 21, 21a respectively electrically connected at one end to the tantalum cathode sheets and at the other end to a source of high voltage current. Glass conduit members 20, 20a enter vessel 16 through suitable vacuum seals 22, 22a in base plate 17. Between tantalum cathode sheets 19, 19a runs a sheet of etched aluminum foil 23 from supply reel 24 to take-up reel 25 which are rotatably mounted on suitable supports (not shown). Aluminum foil strip 23 and reels 24, 25 have a polarity opposite to that of cathode sheets 19, 19a, and for this purpose may be suitably electrically grounded, e.g., via metal base plate 17. Shields 26, 26a made of copper or the like, are arranged adjacent the rear surfaces of cathode sheets 19, 19a to aid in cooling the latter during the sputtering operation.

In the use of the disclosed apparatus for continuous sputtering of tantalum on the aluminum foil, typical conditions include the use of an argon atmosphere in the vessel at a pressure of 10 microns Hg, a voltage of 2500 volts, current of 120 milliamps, tantalum cathode dimensions of 6 inches by 3 inches and aluminum foil strip one-half inch wide and .0005 inch thick. The aluminum foil may be run satisfactorily at a speed of about one inch per minute to deposit a tantalum layer thereon about 2000 Angstrom units thick.

It will be understood that the foregoing values are given only by way of illustration and that they may be varied as desired or necessary without going beyond the scope of the invention.

The apparatus described for the sputtering operation forms no part of the present invention. A description of suitable apparatus and processes for sputtering operations of the type employed in the present invention will be found in the text by L. Holland, "Vacuum Deposition of Thin Films," published by John Wiley & Sons, Inc., New York, 1956.

In tests made on capacitors incorporating electrodes formed of etched aluminum foil having sputtered tantalum thereon, unexpectedly high capacitance per unit area was obtained. In comparing plain tantalum with plain aluminum anodized to the same voltage, the respective values of volt $\mu f./in.^2$ are 140 and 90, giving a ratio of 1.55/1. The following table shows the values in volt-$\mu f./in.^2$ at various formation voltages for a particular etched aluminum foil substrate, and expected and actual values after sputtering:

TABLE I

| D.C. Formation Voltage, volts | Etched Aluminum Substrate | After Sputtering | |
|---|---|---|---|
| | | Expected | Actual |
| 300 | 600 | 930 | 1,200 |
| 250 | 625 | 970 | 1,225 |
| 200 | 680 | 1,055 | 1,300 |
| 150 | 660 | 1,025 | 1,365 |
| 100 | 610 | 945 | 1,590 |
| 50 | 535 | 830 | 1,465 |

The values in the column headed "Expected" were obtained by applying the 1.55 multiplier to the values in the Etched Aluminum Substrate column; they are extremely optimistic in that no allowance is made for tantalum filling the etch pits of the substrate.

As is evident from the table, the values for sputtered tantalum on aluminum are 2 to 2.5 times greater than for the etched aluminum substrate alone.

It is thus evident that the present invention provides for remarkably improved capacitance values in electrolytic capacitors, which enables considerable reduction in the size of the capacitor without sacrifice of capacity.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What we claim as new and desire to secure by Letters Patent is:

1. An electrical capacitor comprising a pair of electrodes and an electrolyte in contact therewith, at least one electrode being composed of an aluminum base member having an etched surface and a continuous coating of tantalum thereon, said tantalum coating having a continuous anodic dielectric oxide film formed thereon, the surface contour of the film-formed tantalum coated electrode substantially corresponding to the etched surface of the aluminum base member.

2. An electrical capacitor comprising a pair of electrodes and an electrolyte in contact therewith, at least one electrode being composed of an aluminum base member having an etched surface and a continuous coating of sputtered tantalum thereon, said tantalum coating having a continuous anodic dielectric oxide film formed thereon, the surface contour of the film-formed tantalum coated electrode substantially corresponding to the etched surface of the aluminum base member, whereby the effective surface area of the tantalum coated electrode is not appreciably less than the effective surface area of the etched aluminum base member when uncoated.

3. An electrode for electrical capacitors comprising an aluminum base member having an etched surface and a continuous coating of sputtered tantalum on said etched aluminum surface, said tantalum coating having a continuous anodic dielectric oxide film formed thereon, the surface contour of the film-formed tantalum coating substantially corresponding to the surface of said aluminum base member, whereby the effective surface area of the tantalum coated electrode is not appreciably less than the effective surface area of the etched aluminum base member when uncoated.

References Cited by the Examiner

UNITED STATES PATENTS

| | | | |
|---|---|---|---|
| 2,037,848 | 4/1936 | Brennan | 117—200 X |
| 2,812,270 | 11/1957 | Alexander | 117—107 X |
| 2,908,595 | 10/1959 | Kohl | 117—107 X |
| 3,001,108 | 9/1961 | Mohler et al. | 317—230 |

JOHN W. HUCKERT, *Primary Examiner.*

DAVID J. GALVIN, *Examiner.*

J. A. ATKINS, *Assistant Examiner.*